United States Patent
Iinuma et al.

(10) Patent No.: US 11,196,922 B2
(45) Date of Patent: Dec. 7, 2021

(54) CONTROL APPARATUS, CONTROL METHOD, PROGRAM, AND ELECTRONIC DEVICE SYSTEM THAT PROVIDE LOW POWER CONSUMPTION

(71) Applicant: Sony Semiconductor Solutions Corporation, Kanagawa (JP)

(72) Inventors: Takahiro Iinuma, Kanagawa (JP); Naoki Kuzuya, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 16/469,670

(22) PCT Filed: Mar. 9, 2018

(86) PCT No.: PCT/JP2018/009149
§ 371 (c)(1),
(2) Date: Jun. 14, 2019

(87) PCT Pub. No.: WO2018/173792
PCT Pub. Date: Sep. 27, 2018

(65) Prior Publication Data
US 2020/0084388 A1 Mar. 12, 2020

(30) Foreign Application Priority Data
Mar. 23, 2017 (JP) .............................. JP2017-057019

(51) Int. Cl.
*H04N 5/228* (2006.01)
*H04N 5/232* (2006.01)
*H04N 5/235* (2006.01)

(52) U.S. Cl.
CPC ..... *H04N 5/232411* (2018.08); *H04N 5/2352* (2013.01); *H04N 5/23219* (2013.01); *H04N 5/23232* (2013.01)

(58) Field of Classification Search
CPC ......... H04N 5/232411; H04N 5/23219; H04N 5/23232; H04N 5/2352
(Continued)

(56) References Cited

U.S. PATENT DOCUMENTS

| 6,343,141 B1 * | 1/2002 | Okada ................ G06K 9/00268 348/587 |
| 2016/0080652 A1 * | 3/2016 | Shirota .................. H04N 7/183 348/222.1 |

FOREIGN PATENT DOCUMENTS

| CN | 105492998 A | 4/2016 |
| JP | 2014-027386 A | 2/2014 |

(Continued)

OTHER PUBLICATIONS

International Search Report and English translation thereof dated May 22, 2018 in connection with International Application No. PCT/JP2018/009149.

*Primary Examiner* — Usman A Khan
(74) *Attorney, Agent, or Firm* — Wolf, Greenfield & Sacks, P.C.

(57) ABSTRACT

The present technology relates to a control apparatus, a control method, a program, and an electronic device system that enables achievement of low power consumption.

The presence or absence of a preset, predetermined subject is detected from an image having a low resolution output by an image sensor in a low power consumption mode, the image sensor including, as operation modes, the low power consumption mode in which the image having the low resolution is output and a normal mode in which an image having a high resolution as compared with the image having the low resolution is output. Then, in a case where the presence of the predetermined subject is detected, the operation mode of the image sensor is set to the normal mode, and (Continued)

the image sensor outputs the image having the high resolution. The present technology may be applied, for example, to control of the image sensor.

8 Claims, 11 Drawing Sheets

(58) Field of Classification Search
USPC .................................................... 348/222.1
See application file for complete search history.

(56) References Cited

FOREIGN PATENT DOCUMENTS

| | | | | |
|---|---|---|---|---|
| JP | 2014027386 | A | * | 2/2014 |
| JP | 2016-062148 | A | | 4/2016 |

* cited by examiner

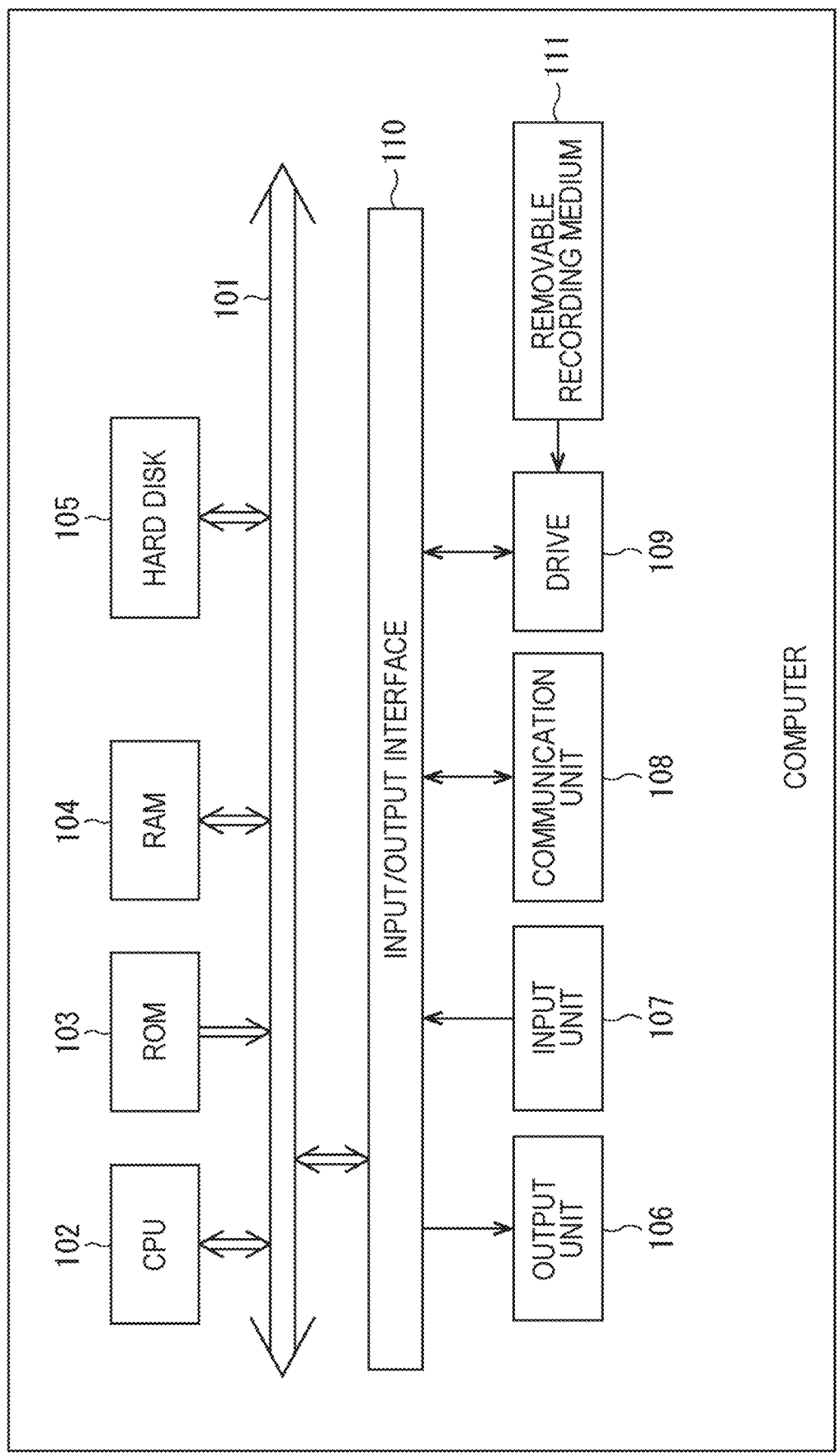

CONTROL APPARATUS, CONTROL METHOD, PROGRAM, AND ELECTRONIC DEVICE SYSTEM THAT PROVIDE LOW POWER CONSUMPTION

CROSS-REFERENCE TO RELATED APPLICATIONS

This application claims the benefit under 35 U.S.C. § 371 as a U.S. National Stage Entry of International Application No. PCT/JP2018/009149, filed in the Japanese Patent Office as a Receiving Office on Mar. 9, 2018, which claims priority to Japanese Patent Application Number JP2017-057019, filed in the Japanese Patent Office on Mar. 23, 2017, each of which is hereby incorporated by reference in its entirety.

TECHNICAL FIELD

The present technology relates to a control apparatus, a control method, a program, and an electronic device system, and particularly relates to a control apparatus, a control method, a program, and an electronic device system that enables, for example, achievement of low power consumption.

BACKGROUND ART

In a device that receives a power supply from a battery and operates, e.g., a wearable device or the like, (hereinafter, also called the battery-mounted device), in order to let the battery to last long, the operation mode is set to a low power consumption mode when not in use, and becomes a waiting state, e.g., a sleep state, a standby state, or the like. Then, when use by a user is detected, the operation mode is set (switched) to a normal mode, and a normal operation is performed.

For example, with a portable terminal described in Patent Document 1, an illuminance sensor detects surrounding illuminance, and in a case where the illuminance is equal to or more than a threshold value, the power of a camera module is turned on, and an image is captured. Then, face recognition processing is performed using the image captured by the camera module. In a case where a face is recognized, the operation mode is set to the normal mode. In a case where the face is not recognized, the operation mode is set to the low power consumption mode (power saving mode).

Thus, with the portable terminal described in Patent Document 1, in a case where the face is recognized, the normal mode is activated, and in a case where the face is not recognized, the low power consumption mode is activated. Therefore, when the user uses the portable terminal, the normal mode is activated, and when the user does not use the portable terminal, the low power consumption mode is activated. It is possible to suppress power consumption when the user does not use the portable terminal.

CITATION LIST

Patent Document

Patent Document 1: Japanese Patent Application Laid-Open No. 2014-027386

SUMMARY OF THE INVENTION

Problems to be Solved by the Invention

With the portable terminal described in Patent Document 1, in a case where the surrounding illuminance is equal to or more than a threshold value, the power of the camera module is turned on, and an image is captured. The image captured by the camera module is used for face recognition processing. Therefore, the image needs to have a certain degree of resolution, e.g., an image of resolution similar to that of a case where the portable terminal is caused to function as a camera (hereinafter also called the image with normal resolution).

Accordingly, with the portable terminal described in Patent Document 1, each time the illuminance equal to or more than a threshold value is detected, the power of the camera module is turned on, and the image with normal resolution is captured.

Furthermore, with the portable terminal described in Patent Document 1, the threshold value of the illuminance is determined with reference to a brightness required for performing the face recognition processing.

Accordingly, with the portable terminal described in Patent Document 1, the illuminance equal to or more than a threshold value is detected frequently. On each occasion, the power of the camera module is turned on, and the image with normal resolution is captured. Therefore, waiting time of the camera module is shortened, resulting in an increase in power consumption.

The present technology has been made in view of such circumstances and enables achievement of low power consumption.

Solutions to Problems

A control apparatus or a program according to the present technology is a control apparatus for an image sensor, including: a detection unit that detects presence or absence of a preset, predetermined subject from an image having a low resolution output from the image sensor in a low power consumption mode, the image sensor including, as operation modes, the low power consumption mode in which the image having the low resolution is output and a normal mode in which an image having a high resolution as compared with the image having the low resolution is output; and a setting unit that sets the operation mode of the image sensor to the normal mode and causes the image sensor to output the image having the high resolution in a case where presence of the predetermined subject is detected, or a program for causing a computer to function as such a control apparatus.

A control method according to the present technology is a control method for an image sensor, including: detecting presence or absence of a preset, predetermined subject from an image having a low resolution output from the image sensor in a low power consumption mode, the image sensor including, as operation modes, the low power consumption mode in which the image having the low resolution is output and a normal mode in which an image having a high resolution as compared with the image having the low resolution is output; and setting the operation mode of the image sensor to the normal mode and causes the image sensor to output the image having the high resolution in a case where presence of the predetermined subject is detected.

An electronic device system according to the present technology is an electronic device system including: an image sensor including, as operation modes, a low power consumption mode in which an image having a low resolution is output and a normal mode in which an image having a high resolution as compared with the image having the low resolution is output; and a control unit that controls the image sensor, the control unit including a detection unit that detects presence or absence of a preset, predetermined subject from the image having the low resolution output from the image sensor in the low power consumption mode; and a setting unit that sets the operation mode of the image sensor to the normal mode and causes the image sensor to output the image having the high resolution in a case where presence of the predetermined subject is detected.

According to the present technology, the presence or absence of a preset, predetermined subject is detected from an image having the low resolution output by an image sensor in the low power consumption mode, the image sensor including, as operation modes, the low power consumption mode in which the image having the low resolution is output and a normal mode in which an image having a high resolution as compared with the image having the low resolution is output. Then, in a case where the presence of the predetermined subject is detected, the operation mode of the image sensor is set to the normal mode, and the image sensor outputs the image having the high resolution.

Note that the control apparatus may be an independent apparatus, or may be an internal block constituting a single apparatus.

Furthermore, the program can be provided by being transferred via a transfer medium or by being recorded on a recording medium.

Effects of the Invention

According to the present technology, it is possible to achieve low power consumption.

Note that effects described herein are not necessarily limited, but may also be any of those described in the present disclosure.

BRIEF DESCRIPTION OF DRAWINGS

FIG. 11 is a block diagram illustrating a configuration example of an embodiment of a computer to which the present technology has been applied.

MODE FOR CARRYING OUT THE INVENTION

<An Embodiment of the Electronic Device System to which the Present Technology has been Applied>

Figure 1:
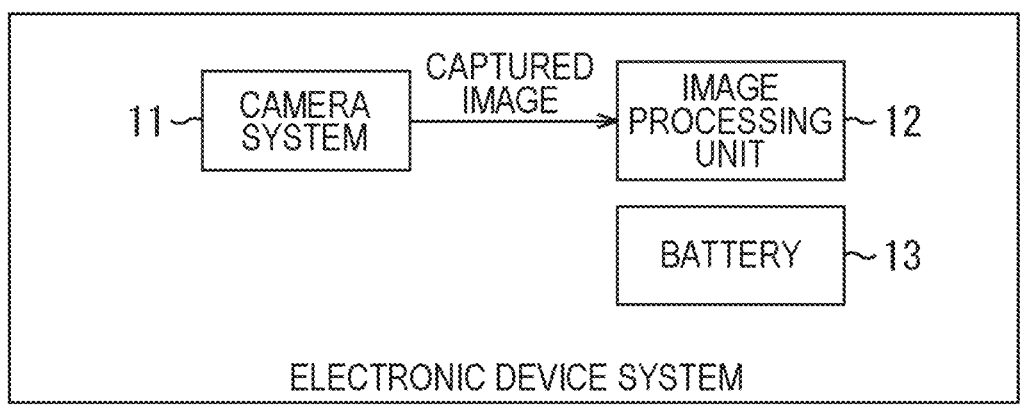
FIG. 1 is a block diagram illustrating a configuration example of an embodiment of an electronic device system to which the present technology has been applied.

FIG. 1 is a block diagram illustrating a configuration example of an embodiment of an electronic device system to which the present technology has been applied.

In FIG. 1, the electronic device system includes the camera system 11, an image processing unit 12, and a battery 13.

The camera system 11 captures an image and supplies the captured image obtained as a result of the capturing, to the image processing unit 12.

The image processing unit 12 performs image processing on the captured image from the camera system 11.

The battery 13 supplies necessary power to the camera system 11, the image processing unit 12, and a block constituting the electronic device system, the block being not illustrated.

The electronic device system described above can be applied, for example, to a portable terminal, e.g., a smartphone, an electronic lock of a building, a surveillance camera, e.g., of a house or a pay parking lot, a wearable device, e.g., of a wristband type or a glasses type, and any apparatus that captures an image and performs image processing on the image, particularly a battery-mounted device that receives power supply from a battery and operates. However, the electronic device system can be applied to a device that receives power supply, e.g., from a power outlet, and operates, other than the battery-mounted device.

For example, in a case where the electronic device system is applied to a smartphone, the image processing unit 12 performs authentication processing using a captured image as image processing. Only in a case where authentication is succeeded, the smartphone is unlocked, and the smartphone can be brought into a usable state in which normal use is allowed.

Furthermore, for example, in a case where the electronic device system is applied to an electronic lock, the image processing unit 12 performs authentication processing using a captured image as image processing. Only in a case where authentication is succeeded, the electronic lock can be unlocked.

Moreover, for example, in a case where the electronic device system is applied to a surveillance camera of a house or a pay parking lot, the image processing unit 12 can record a captured image of a suspicious person wandering around a house, or a so-called number plate (e.g., car registration number) of an illegally parking automobile, as image processing.

Note that the image processing unit 12 can be provided separately from the camera system 11 or can be incorporated into (e.g., a control unit 22, which is described later, of) the camera system 11.

<Configuration Example of the Camera System 11>

Figure 2:
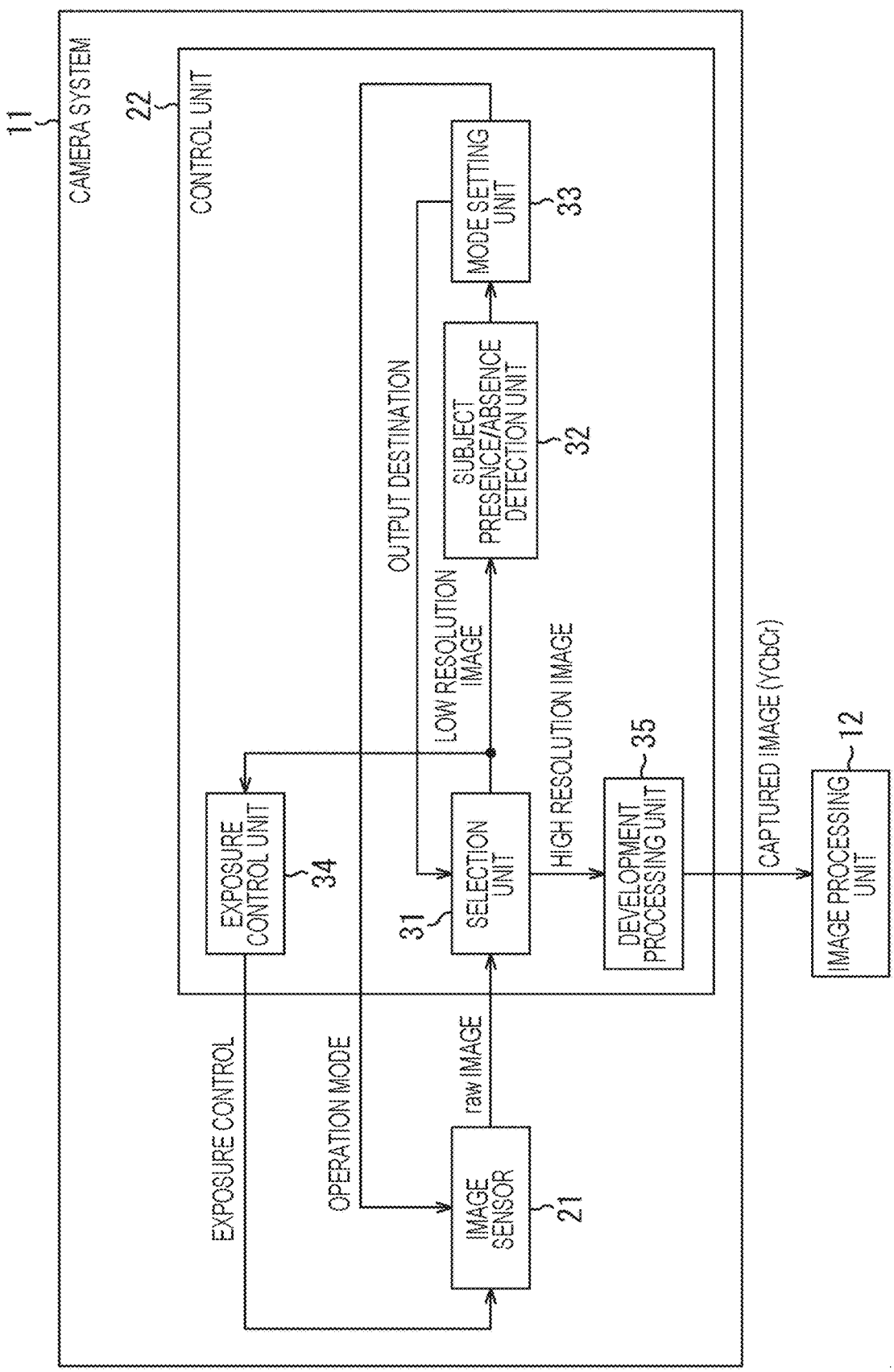
FIG. 2 is a block diagram illustrating a configuration example of a camera system 11.

FIG. 2 is a block diagram illustrating a configuration example of the camera system 11 of FIG. 1.

In FIG. 2, the camera system includes an image sensor 21 and the control unit 22.

The image sensor 21 is, for example, a complementary metal oxide semiconductor (CMOS) image sensor. The image sensor 21 includes a low power consumption mode that outputs a low resolution image having low resolution and a normal mode that outputs a high resolution image having a resolution higher than that of the low resolution image, as the operation modes.

The image sensor 21 sets the operation mode according to control by the control unit 22, captures an image in the operation mode and outputs a so-called raw image.

Here, with the image sensor 21 in the low power consumption mode, the output of a low resolution image can be performed, for example, by floating diffusion (FD) addition, thinning-out readout of a pixel value (charge) from a pixel, or the like.

In the FD addition, with the image sensor 21, pixels, which constitute the image sensor 21 and are not illustrated, share the FD in units of a plurality of pixels, and in the FD, each pixel value of the plurality of pixels, e.g., pixels sharing the FD, is added.

The image sensor 21 has an AD converter (ADC) (not illustrated) that analog-to-digital (AD) converts the pixel value. However, in a case of performing FD addition or thinning-out reading of the pixel value, the number of pixel values to be read is smaller, resulting in a reduction in number of ADCs that are needed to be operated. Moreover, the speed of reading the pixel value or the speed of the operation of the ADC may be slow. Accordingly, with the image sensor 21 in the low power consumption mode, as compared with the case of the normal mode that outputs a high resolution image, it is possible to considerably suppress the power consumption.

In the low power consumption mode, the image sensor 21 outputs a low resolution image with an extremely low resolution, for example, about 16×9 pixels in height and width, or the like by the aforementioned FD addition or thinning-out reading of pixels.

Meanwhile, in the normal mode, the image sensor 21 outputs, for example, high definition (HD) image using all pixels of the image sensor 21, or a so-called 4 k image, an 8 k image, or the like, as the high resolution image.

A raw image, which is the low resolution image or the high resolution image output by the image sensor 21, is supplied to the control unit 22.

Note that, as the image sensor 21, in addition to an image sensor that receives (captures) visible light, an image sensor that receives light (electromagnetic wave) other than visible light, e.g., infrared light or the like, can be adopted.

The control unit 22 controls capturing of an image by the image sensor 21.

The control unit 22 includes a selection unit 31, a subject presence/absence detection unit 32, a mode setting unit 33, an exposure control unit 34, and a development processing unit 35.

The selection unit 31 selects one of the subject presence/absence detection unit 32 and the development processing unit 35 as a destination of the output of the raw image from the image sensor 21 according to control of the mode setting unit 33, and outputs the raw image to the selected one.

Here, in a case where the operation mode of the image sensor 21 is the normal mode and the image sensor 21 outputs a high resolution image, the mode setting unit 33 controls the selection unit 31 to select the development processing unit 35 as a destination of the output of the high resolution image. Furthermore, in a case where the operation mode of the image sensor 21 is the low power consumption mode and the image sensor 21 outputs a low resolution image, the mode setting unit 33 controls the selection unit 31 to select the subject presence/absence detection unit 32 as a destination of the output of the low resolution image.

Accordingly, in a case where the image sensor 21 outputs the high resolution image, the high resolution image is supplied to the development processing unit 35 via the selection unit 31. Furthermore, in a case where the image sensor 21 outputs the low resolution image, the low resolution image is supplied to the subject presence/absence detection unit 32 via the selection unit 31. Note that, regarding a block not selected as a (direct or indirect) destination of the output of the image from the selection unit 31, supply of the power can be stopped. In this case, it is possible to achieve low power consumption of the camera system 11 (and eventually, the electronic device system).

The subject presence/absence detection unit 32 detects the presence or absence of a preset, predetermined subject (hereinafter also called the set subject) from the low resolution image supplied from the selection unit 31. In other words, the subject presence/absence detection unit 32 detects whether the set subject is shown in the low resolution image supplied from the selection unit 31.

The subject presence/absence detection unit 32 supplies detection information indicating results of the detection as to the presence or absence of the set subject in the low resolution image to the mode setting unit 33.

Here, as the set subject, not only an individual item (individual object) such as a specific person, an eye of a specific person, a specific automobile, or the like, but also general things belonging to a certain category such as any person, an eye of any person, any automobile, or the like are adopted. Accordingly, even when a target for which the presence or absence of the set subject is detected is a low resolution image, the presence or absence of the set subject can be detected precisely.

The mode setting unit 33 sets the operation mode of the image sensor 21 depending on the detection information from the subject presence/absence detection unit 32 and controls the selection unit 31 depending on the operation mode.

In other words, the mode setting unit 33 sets the operation mode of the image sensor 21 to the low power consumption mode, for example, at a time of activation of the control unit 22, or the like, or in a case where the detection information from the subject presence/absence detection unit 32 does not indicate the presence of the set subject (the set subject is shown in the low resolution image), or the like.

Furthermore, the mode setting unit 33 sets the operation mode of the image sensor 21 to the normal mode, for example, in a case where the detection information from the subject presence/absence detection unit 32 indicates the presence of the set subject.

As described above, the image sensor 21 operates with low power consumption in the low power consumption mode and captures and outputs the low resolution image, and captures and outputs the high resolution image in the normal mode.

Here, as described above, in FIG. 2, the image sensor 21 operates in the low power consumption mode in normal state (in usual time), and operates in the normal mode in a case where the presence of the set subject is detected. Accordingly, the image sensor 21 operates in the normal mode intermittently so to speak.

In a case where the operation mode of the image sensor 21 is set to the low power consumption mode, the mode setting unit 33 controls the selection unit 31 to select the subject presence/absence detection unit 32 as a destination of the output of the raw image, which is the low resolution image output from the image sensor 21, depending on the low power consumption mode.

Furthermore, in a case where the operation mode of the image sensor 21 is set to the normal mode, the mode setting unit 33 controls the selection unit 31 to select the development processing unit 35 as a destination of the output of the raw image, which is the high resolution image output from the image sensor 21, depending on the normal mode.

The exposure control unit 34 controls exposure of the image sensor 21 depending on the low resolution image output to the subject presence/absence detection unit 32 by the selection unit 31. For example, in a case where the luminance of the low resolution image is too low, the exposure control unit 34 controls the image sensor 21 to increase the exposure time. Furthermore, for example, in a case where the luminance of the low resolution image is too high, the exposure control unit 34 controls the image sensor 21 to shorten the exposure time. Note that the exposure control unit 34 can control exposure to set the subject shown in the low resolution image within a proper exposure range, for example, by conventional AutoExposure technology or the like. Furthermore, the exposure control unit 34 can control exposure to set every dynamic range assumed to be the subject within the exposure range, for example, by conventional WideDynamicRange technology.

The development processing unit 35 performs development processing of the raw image, which is the high resolution image supplied from the selection unit 31, for example, so as to convert the raw image of RGB (red, green, blue) into an image of YCbCr and outputs the image to the image processing unit 12 as the captured image.

<Processing of the Electronic Device System>

Figure 3:
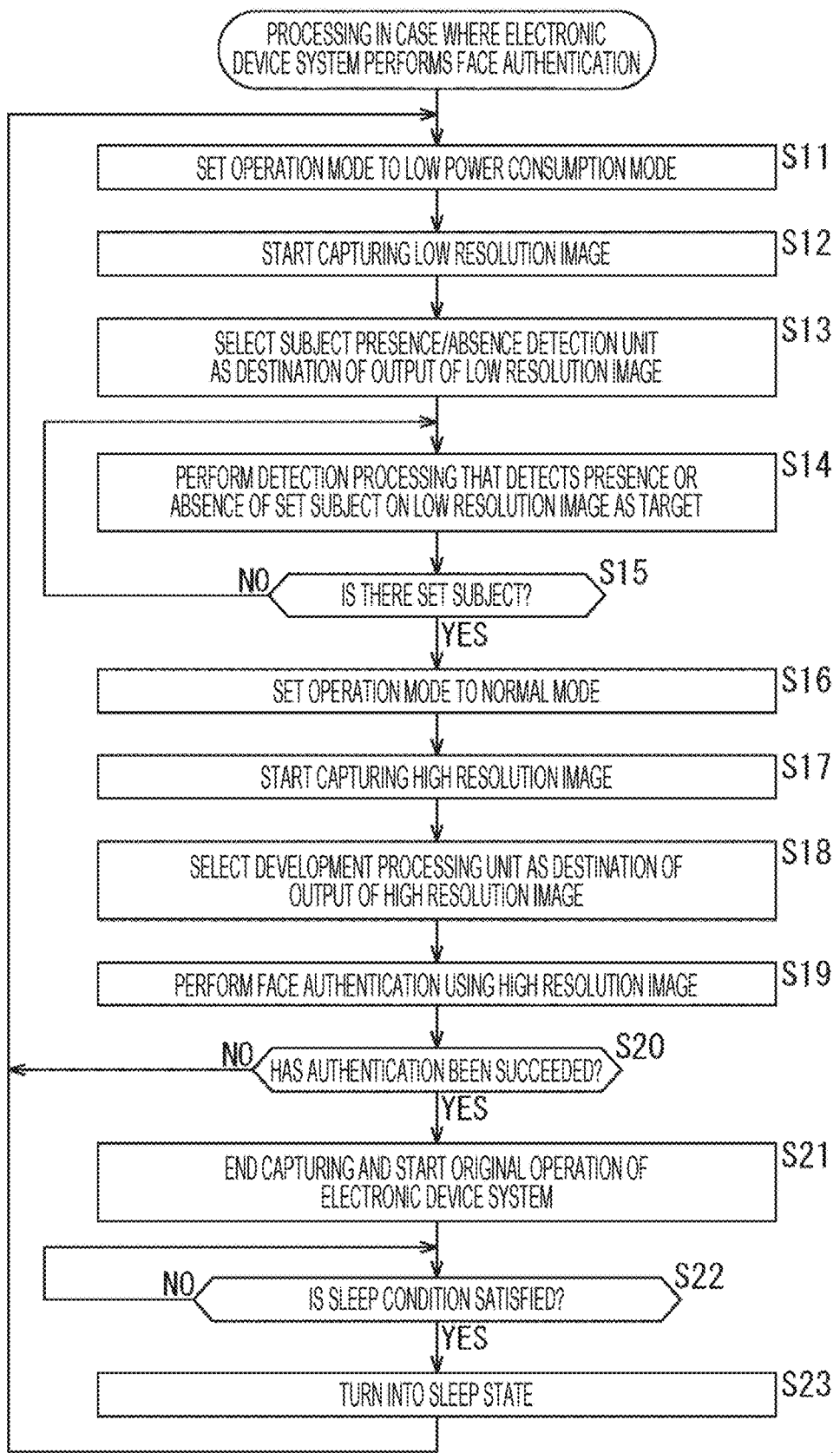
FIG. 3 is a flowchart explaining an example of processing in a case where an electronic device system performs face authentication.

FIG. 3 is a flowchart explaining an example of processing in a case where the electronic device system of FIG. 1 performs, for example, face authentication.

In other words, FIG. 3 is a flowchart explaining an example of processing in a case where a smartphone is unlocked and original processing of the smartphone is performed in a case where the electronic device system is the smartphone and face authentication is succeeded.

In step S11, the mode setting unit 33 sets the operation mode of the image sensor 21 to the low power consumption mode, and the processing proceeds to step S12.

In step S12, the image sensor 21 sets the operation mode to the low power consumption mode and starts capturing the low resolution image according to setting (control) of the mode setting unit 33, and the processing proceeds to step S13.

The low resolution image captured by the image sensor 21 in the low power consumption mode is supplied to the selection unit 31.

In step S13, depending on the fact that the operation mode of the image sensor 21 is the low power consumption mode, the mode setting unit 33 causes the selection unit 31 to select the subject presence/absence detection unit 32 as a destination of the output of the low resolution image from the image sensor 21. Thus, the low resolution image supplied to the selection unit 31 from the image sensor 21 is supplied to the subject presence/absence detection unit 32.

Here, the low resolution image supplied to the subject presence/absence detection unit 32 by the selection unit 31 is also supplied to the exposure control unit 34. The exposure control unit 34 controls exposure of the image sensor 21 depending on the low resolution image.

Thereafter, the processing proceeds to step S14 from step S13. The subject presence/absence detection unit 32 performs detection processing for detecting the presence or absence of the set subject from the low resolution image supplied from the selection unit 31, and supplies the detection information indicating the result of the detection to the mode setting unit 33. The processing proceeds to step S15.

Here, in a case where face authentication is performed, as the set subject, the face (head) (of a person without limitation of individual), which is a target of the face authentication is adopted.

In step S15, the mode setting unit 33 determines whether the set subject is present (shown) in the low resolution image depending on the detection information from the subject presence/absence detection unit 32.

In step S15, in a case where it is determined that the set subject is not present (shown) in the low resolution image, the processing returns to step S14, and the detection processing is repeated.

Furthermore, in step S15, in a case where it is determined that the set subject is present in the low resolution image, i.e., in a case where the low resolution image shows the face, which is a target of face authentication, the processing proceeds to step S16.

In step S16, the mode setting unit 33 sets the operation mode of the image sensor 21 to the normal mode, and the processing proceeds to step S17.

In step S17, the image sensor 21 sets the operation mode to the normal mode and starts capturing the high resolution image according to setting of the mode setting unit 33, and the processing proceeds to step S18.

The high resolution image captured by the image sensor 21 in the normal mode is an image showing the face whose presence is detected in the low resolution image in the detection processing, and is supplied to the selection unit 31.

In step S18, depending on the fact that the operation mode of the image sensor 21 is the normal mode, the mode setting unit 33 causes the selection unit 31 to select the development processing unit 35 as a destination of the output of the high resolution image from the image sensor 21. Thus, the high resolution image supplied to the selection unit 31 from the image sensor 21 is supplied to the development processing unit 35.

The development processing unit 35 performs development processing of the high resolution image, which is supplied from the selection unit 31 so as to convert the high resolution image of RGB into a high resolution image of YCbCr and outputs the image to the image processing unit 12 as the captured image.

Thereafter, the processing proceeds to step S19 from step S18. The image processing unit 12 performs (individual authentication by) face authentication using the captured image, which is the high resolution image from the development processing unit 35, and the processing proceeds to step S20.

In step S20, the image processing unit 12 determines whether the face authentication using the high resolution image has been succeeded.

In step S20, in a case where it is determined that the face authentication has not been succeeded, i.e., in a case where the face shown in the high resolution image is not the face of the owner (specific individual) of the electronic device system, which is a smartphone, the processing returns to step S11, and similar processing is repeated subsequently.

Furthermore, in step S20, in a case where it is determined that the face authentication has been succeeded, i.e., in a case where the face shown in the high resolution image is the face of the owner of the electronic device system, which is a smartphone, the processing proceeds to step S21.

In step S21, the electronic device system, which is a smartphone, starts the original operation of the smartphone, and the processing proceeds to step S22.

In step S22, the electronic device system, which is a smartphone, determines whether a sleep condition into a sleep state is satisfied.

Here, as the sleep condition, it is possible to adopt that, for example, the power button of the electronic device system, which is a smartphone, is operated to be a sleep state, no operation has been performed on the electronic device system, which is a smartphone for a certain time or more, or the like.

In step S22, in a case where it is determined that the sleep condition is not satisfied, the processing returns to step S22.

Furthermore, in step S22, in a case where it is determined that the sleep condition is satisfied, the processing proceeds to step S23. The electronic device system, which is a smartphone, turns into a sleep state. The processing returns to step S11. Similar processing is repeated subsequently.

As described above, by the processing according to the flowchart of FIG. 3, while the set subject is not present in the image (low resolution image) output by the image sensor 21, the image sensor 21 operates in the low power consumption mode, and when the presence of the set subject is confirmed, starts operating in the normal mode.

Accordingly, as compared with the case where the image sensor 21 invariably operates in the normal mode regardless of the presence of the set subject, it is possible to considerably reduce the power consumption of the image sensor 21 while waiting for execution of the face authentication by the image processing unit 12. Thus, it is possible to increase the lasting time of the battery 13 (FIG. 1).

According to a simulation performed by the present inventor, in the case of waiting for execution of the face authentication in the low power consumption mode, it is confirmed that the power consumption of the image sensor 21 can be reduced to about 1/40 (e.g., about 1.5 mW) of the case of waiting for execution of the face authentication in the normal mode.

Furthermore, by the processing according to the flowchart of FIG. 3, in a case where the presence of the set subject is confirmed in the low resolution image captured in the low power consumption mode, the high resolution image is captured in the normal mode, and the face authentication is performed using the resulting high resolution image. Accordingly, the face authentication with high precision can be performed.

Figure 4:
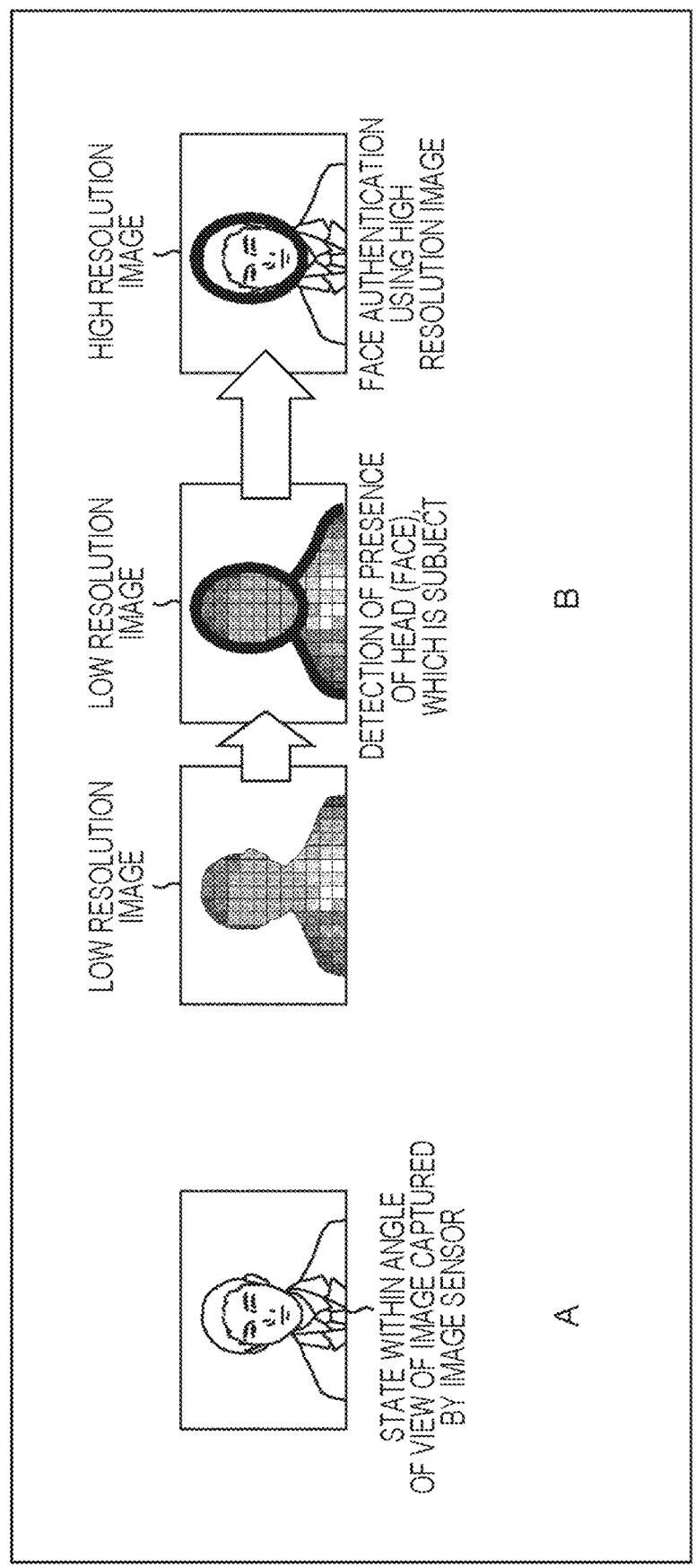
FIG. 4 is a diagram further explaining an example of processing in a case where the electronic device system performs the face authentication.

FIG. 4 is a diagram further explaining an example of processing in a case where the electronic device system of FIG. 1 performs the face authentication.

A of FIG. 4 illustrates a state in the angle of view of an image captured by the image sensor 21. In A of FIG. 4, the face (head) (without limitation of individual), which is a target of the face authentication, is present within the angle of view of the image captured by the image sensor 21.

B of FIG. 4 is a diagram illustrating processing of the electronic device system, which is a smartphone, in a case where state of the angle of view of A of FIG. 4 is captured by the image sensor 21.

With the electronic device system, a state within the angle of view of A of FIG. 4 is captured in the low power consumption mode by the image sensor 21, and the low resolution image obtained by the capturing is supplied to the subject presence/absence detection unit 32 via the selection unit 31.

In the subject presence/absence detection unit 32, the detection processing is performed with the head (face), which is a target of the face authentication, being the set subject, to detect the presence or absence of the head, which is the set subject, from the low resolution image captured in the low power consumption mode.

Here, as the detection processing for detecting the presence or absence of the head, which is the set subject, from the low resolution image, it is possible to adopt simple processing, e.g., processing that performs, for example, detection of an oval or rectangular object from a vicinity of the center of the low resolution image and detection of a structure of a shoulder toward an outer edge of the low resolution image. The detection processing targeted on the low resolution image is not required to detect the head of a specific person. This is because it is sufficient if the presence of the head of any person is detected.

By the detection of an oval or rectangular object and the detection of a structure of a shoulder toward an outer edge of the low resolution image described above, even from a low resolution image of about 16×9 pixels, it is possible to detect the head with sufficient precision for setting (switching) of the operation mode of the image sensor 21.

Note that an algorithm of the detection processing for detecting the presence of absence of the set subject from the low resolution image is not particularly limited. For example, by the detection processing for detecting the presence or absence of the head, which is the set subject, from the low resolution image, it is possible to detect the presence or absence of the head, which is the set subject, according to a learning algorithm that determines whether the head is shown in the low resolution image, or the like, without performing the detection of a structure of a shoulder.

By the detection processing performed in the subject presence/absence detection unit 32, when the presence of the head, which is the set subject, is detected from the low resolution image, the image sensor 21 turns into the normal mode and starts capturing the high resolution image.

Then, in the image processing unit 12, the face authentication is performed using the high resolution image captured by the image sensor 21 in the normal mode.

Figure 5:
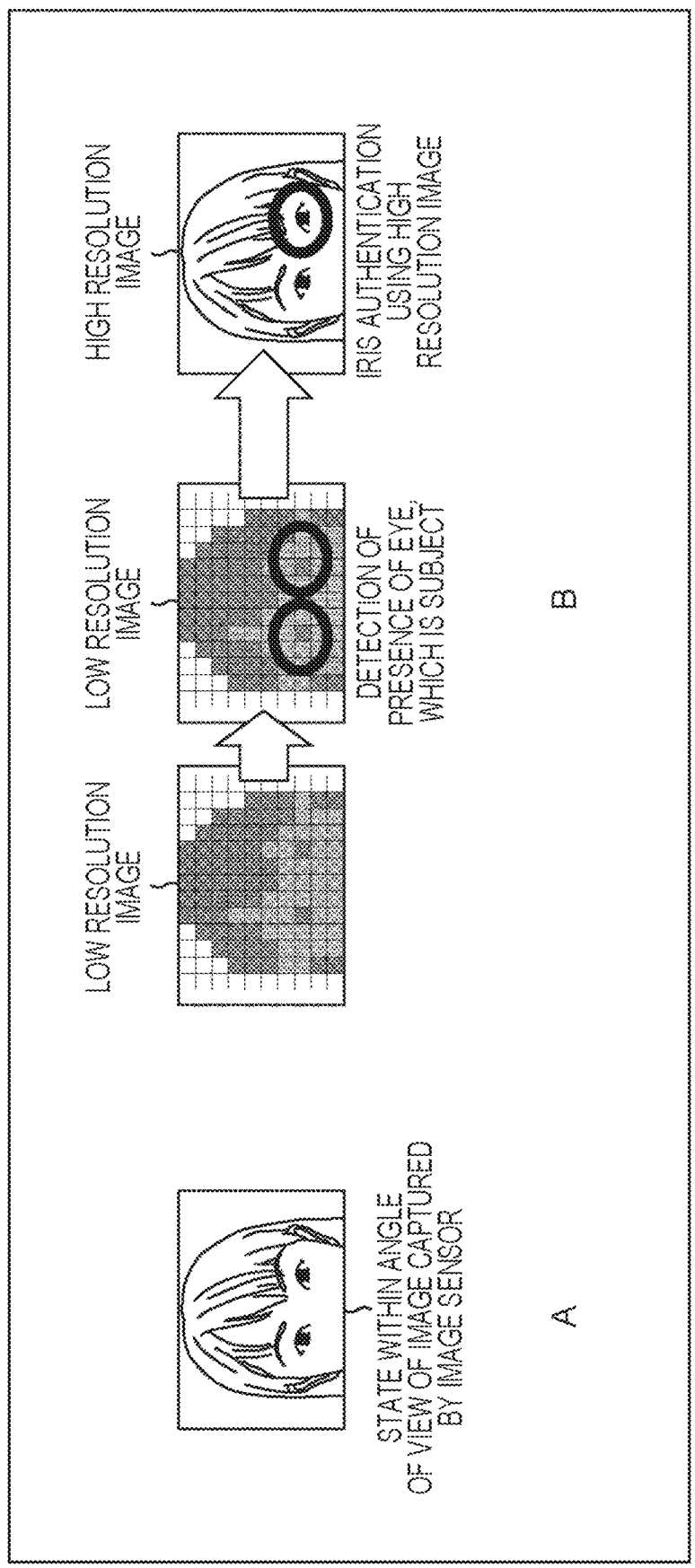
FIG. 5 is a diagram explaining an example of processing in a case where an electronic device system performs iris authentication.

FIG. 5 is a diagram explaining an example of processing in a case where the electronic device system of FIG. 1 performs iris authentication.

A of FIG. 5 illustrates a state in the angle of view of an image captured by the image sensor 21. In A of FIG. 5, an eye, which is a target of the iris authentication, is present within the angle of view of the image captured by the image sensor 21.

B of FIG. 5 is a diagram illustrating processing of the electronic device system, which is a smartphone, in a case where state of the angle of view of A of FIG. 5 is captured by the image sensor 21.

With the electronic device system, a state within the angle of view of A of FIG. 5 is captured in the low power consumption mode by the image sensor 21, and the low resolution image obtained by the capturing is supplied to the subject presence/absence detection unit 32 via the selection unit 31.

In the subject presence/absence detection unit 32, the detection processing is performed with the eye, which is a target of the iris authentication, being the set subject, to detect the presence or absence of the eye, which is the set subject, from the low resolution image captured in the low power consumption mode.

Here, as the detection processing for detecting the presence or absence of the eye, which is the set subject, from the low resolution image, simple processing can be adopted. The detection processing is not required to detect the eye of a specific person. This is because it is sufficient if the presence of the eye of any person is detected.

By the detection processing performed in the subject presence/absence detection unit 32, when the presence of the eye, which is the set subject, is detected from the low resolution image, the image sensor 21 turns into the normal mode and starts capturing the high resolution image.

Then, in the image processing unit 12, the iris authentication is performed using the high resolution image captured by the image sensor 21 in the normal mode.

Figure 6:
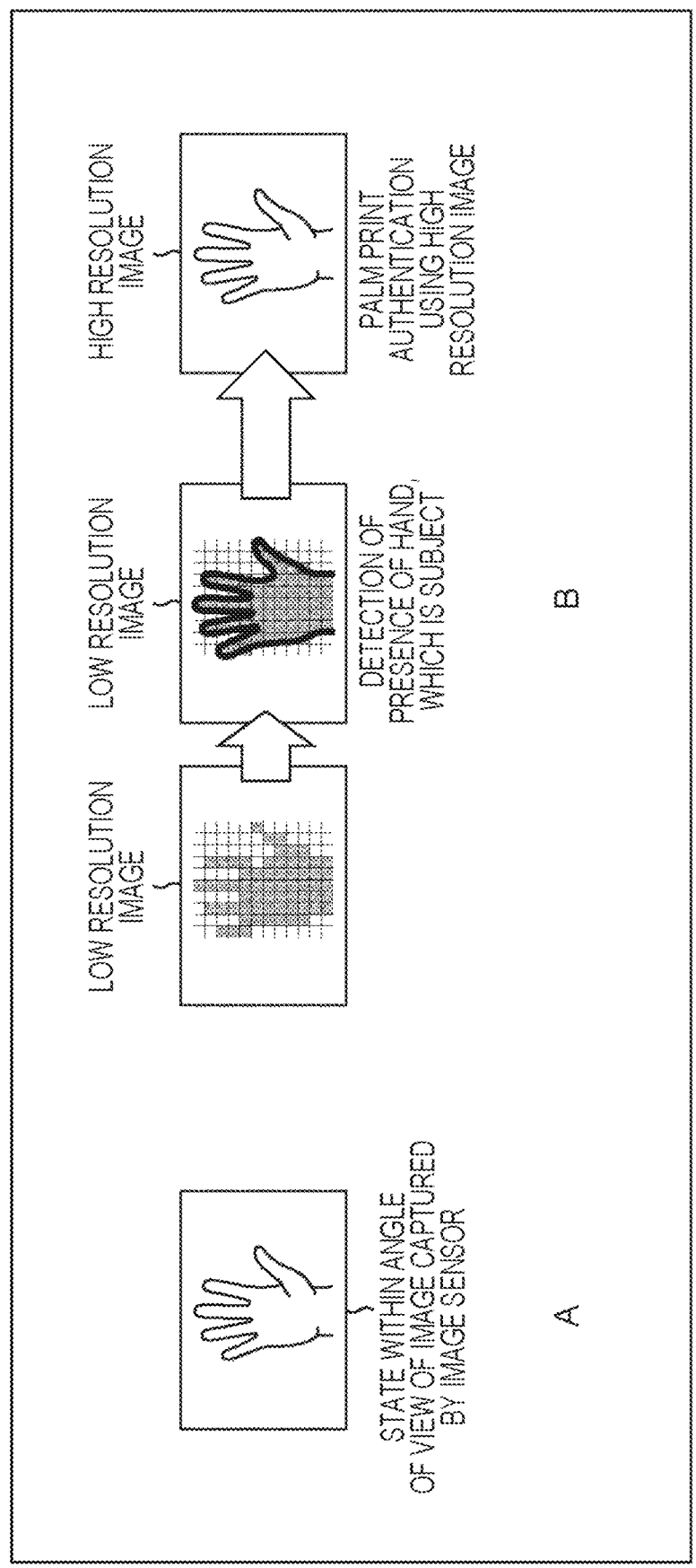
FIG. 6 is a diagram explaining an example of processing in a case where an electronic device system performs palm print authentication.

FIG. 6 is a diagram explaining an example of processing in a case where the electronic device system of FIG. 1 performs palm print authentication.

A of FIG. 6 illustrates a state in the angle of view of an image captured by the image sensor 21. In A of FIG. 6, a hand, which is a target of the palm print authentication, is present within the angle of view of the image captured by the image sensor 21.

B of FIG. 6 is a diagram illustrating processing of the electronic device system, which is a smartphone, in a case where state of the angle of view of A of FIG. 6 is captured by the image sensor 21.

With the electronic device system, a state within the angle of view of A of FIG. 6 is captured in the low power consumption mode by the image sensor 21, and the low resolution image obtained by the capturing is supplied to the subject presence/absence detection unit 32 via the selection unit 31.

In the subject presence/absence detection unit 32, the detection processing is performed with the hand, which is a target of the palm print authentication, being the set subject, to detect the presence or absence of the hand, which is the set subject, from the low resolution image captured in the low power consumption mode.

Here, as the detection processing for detecting the presence or absence of the hand, which is the set subject, from the low resolution image, simple processing can be adopted. The detection processing is not required to detect the hand of a specific person. This is because it is sufficient if the presence of the hand of any person is detected.

By the detection processing performed in the subject presence/absence detection unit 32, when the presence of the hand, which is the set subject, is detected from the low resolution image, the image sensor 21 turns into the normal mode and starts capturing the high resolution image.

Then, in the image processing unit 12, the palm print authentication is performed using the high resolution image captured by the image sensor 21 in the normal mode.

Figure 7:
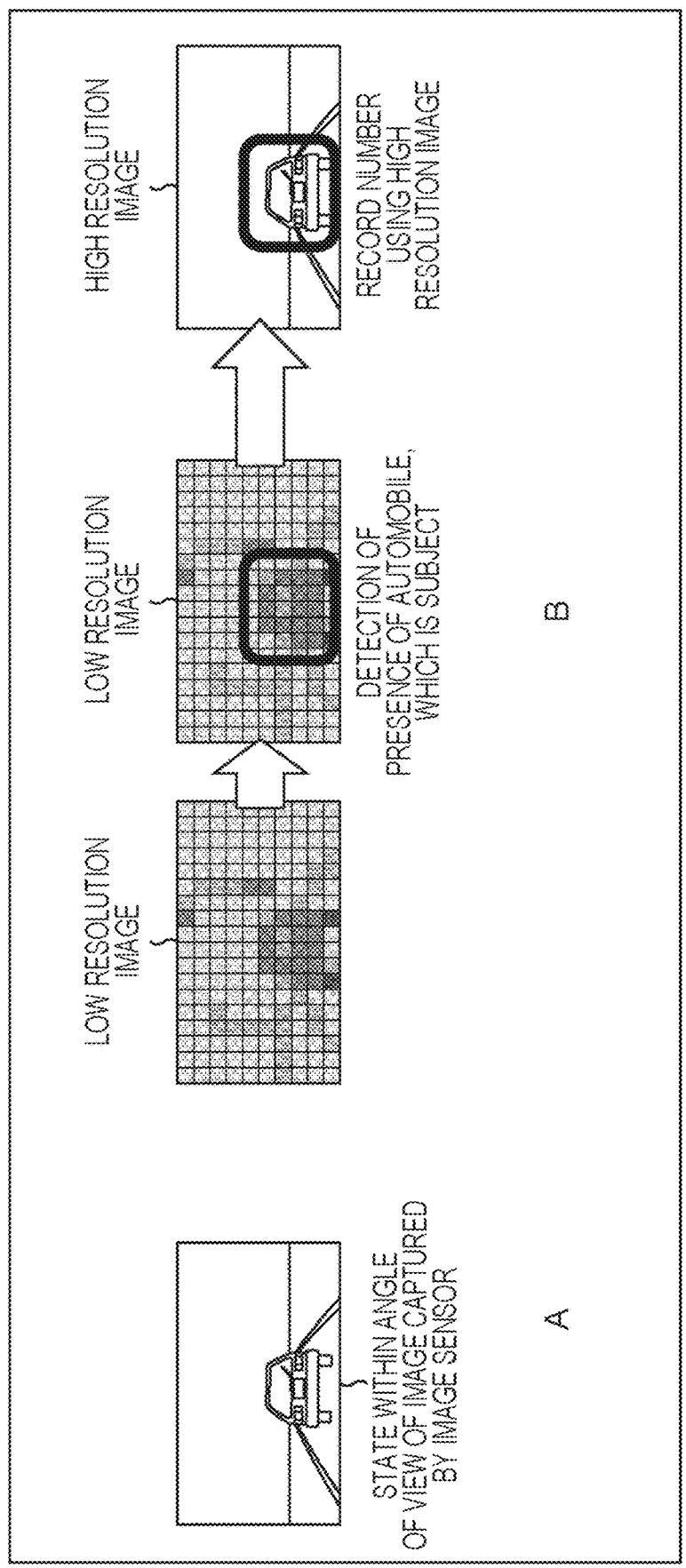
FIG. 7 is a diagram explaining an example of processing in a case where an electronic device system is a surveillance camera of a pay parking lot and records the number plate of a parked automobile.

FIG. 7 is, for example, a diagram explaining an example of processing in a case where the electronic device system of FIG. 1 is a surveillance camera of a pay parking lot and records the number plate of a parked automobile to cope with illegal parking.

A of FIG. 7 illustrates a state in the angle of view of an image captured by the image sensor 21. In A of FIG. 7, an automobile, which is a target of the record, is present within the angle of view of the image captured by the image sensor 21.

B of FIG. 7 is a diagram illustrating processing of the electronic device system, which is a surveillance camera, in a case where state of the angle of view of A of FIG. 7 is captured by the image sensor 21.

With the electronic device system, a state within the angle of view of A of FIG. 7 is captured in the low power consumption mode by the image sensor 21, and the low resolution image obtained by the capturing is supplied to the subject presence/absence detection unit 32 via the selection unit 31.

In the subject presence/absence detection unit 32, the detection processing is performed with the automobile, which is a target of the record, being the set subject, to detect the presence or absence of the automobile, which is the set subject, from the low resolution image captured in the low power consumption mode.

Here, as the detection processing for detecting the presence or absence of the automobile, which is the set subject, from the low resolution image, simple processing can be adopted. The detection processing is not required to detect a specific automobile. This is because it is sufficient if the presence of any automobile is detected.

By the detection processing performed in the subject presence/absence detection unit 32, when the presence of the automobile, which is the set subject, is detected from the low resolution image, the image sensor 21 turns into the normal mode and starts capturing the high resolution image.

Then, in the image processing unit 12, the record (video recording) of the high resolution image captured by the image sensor 21 in the normal mode is performed.

Note that, in this case, regarding the record of the high resolution image, for example, until the automobile shown in the high resolution image disappears (until the automobile is not shown in the high resolution image), it is possible to video-record the high resolution image in a moving image or record the high resolution image in a single or a plurality of still images. Then, in a case where the automobile is not shown in the high resolution image, or the like, it is possible to return the operation mode of the image sensor 21 to the low power consumption mode.

Figure 8:
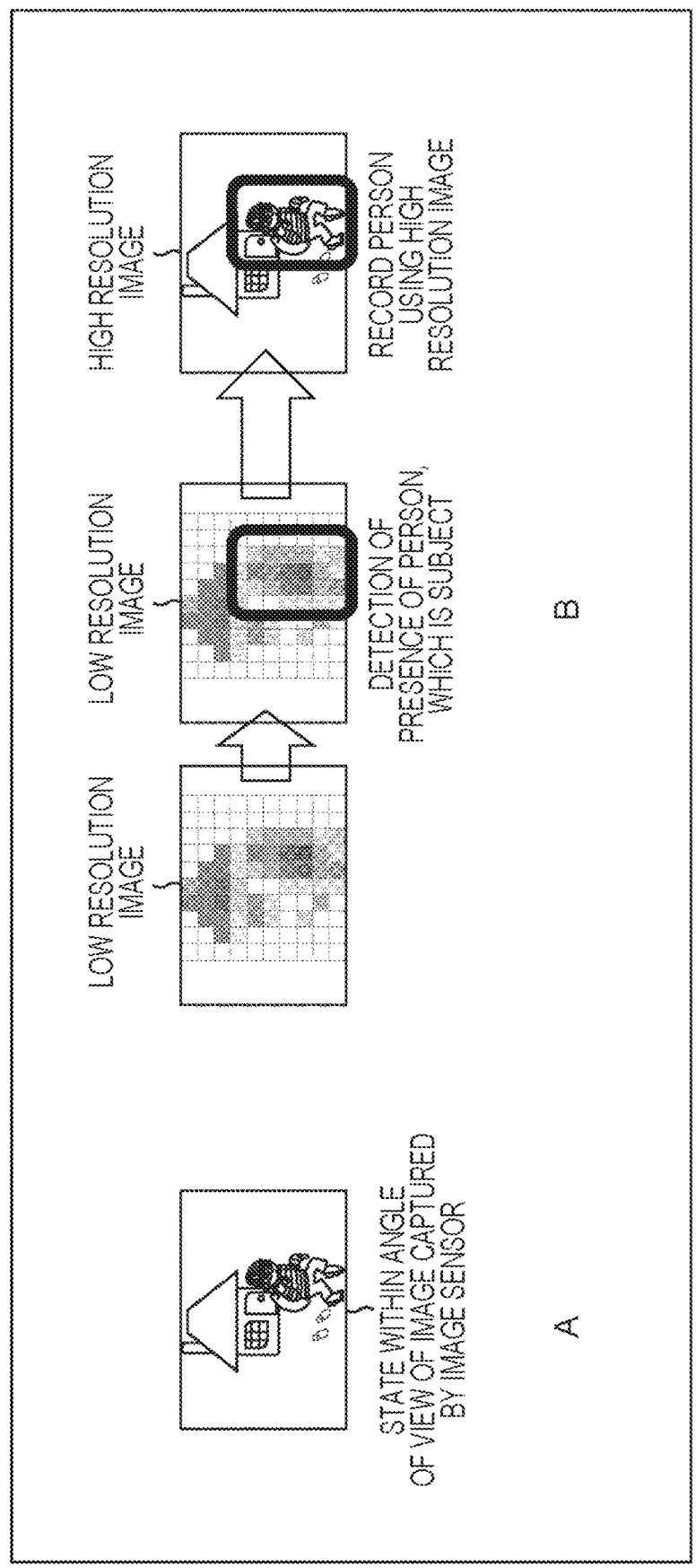
FIG. 8 is a diagram explaining an example of processing in a case where an electronic device system is a surveillance camera of a house and records a suspicious person.

FIG. 8 is a diagram explaining an example of processing in a case where the electronic device system of FIG. 1 is a surveillance camera of a house and records a suspicious person.

A of FIG. 8 illustrates a state in the angle of view of an image captured by the image sensor 21. In A of FIG. 8, a person, which is a target of the record, is present within the angle of view of the image captured by the image sensor 21.

B of FIG. 8 is a diagram illustrating processing of the electronic device system, which is a surveillance camera, in a case where state of the angle of view of A of FIG. 8 is captured by the image sensor 21.

With the electronic device system, a state within the angle of view of A of FIG. 8 is captured in the low power consumption mode by the image sensor 21, and the low resolution image obtained by the capturing is supplied to the subject presence/absence detection unit 32 via the selection unit 31.

In the subject presence/absence detection unit 32, the detection processing is performed with the person, which is a target of the record, being the set subject, to detect the presence or absence of the person, which is the set subject, from the low resolution image captured in the low power consumption mode.

Here, as the detection processing for detecting the presence or absence of the person, which is the set subject, from the low resolution image, simple processing can be adopted. The detection processing is not required to detect a specific person. This is because it is sufficient if the presence of any person is detected.

By the detection processing performed in the subject presence/absence detection unit 32, when the presence of the person, which is the set subject, is detected from the low resolution image, the image sensor 21 turns into the normal mode and starts capturing the high resolution image.

Then, in the image processing unit 12, the record (video recording) of the high resolution image captured by the image sensor 21 in the normal mode is performed.

Note that, in this case, regarding the record of the high resolution image, for example, until the person shown in the high resolution image disappears (until the person is not shown in the high resolution image), it is possible to video-record the high resolution image in a moving image or record the high resolution image in a single or a plurality of still images. Then, in a case where the person is not shown in the high resolution image, or the like, it is possible to return the operation mode of the image sensor 21 to the low power consumption mode.

<Different Configuration Example of the Camera System 11>

Figure 9:
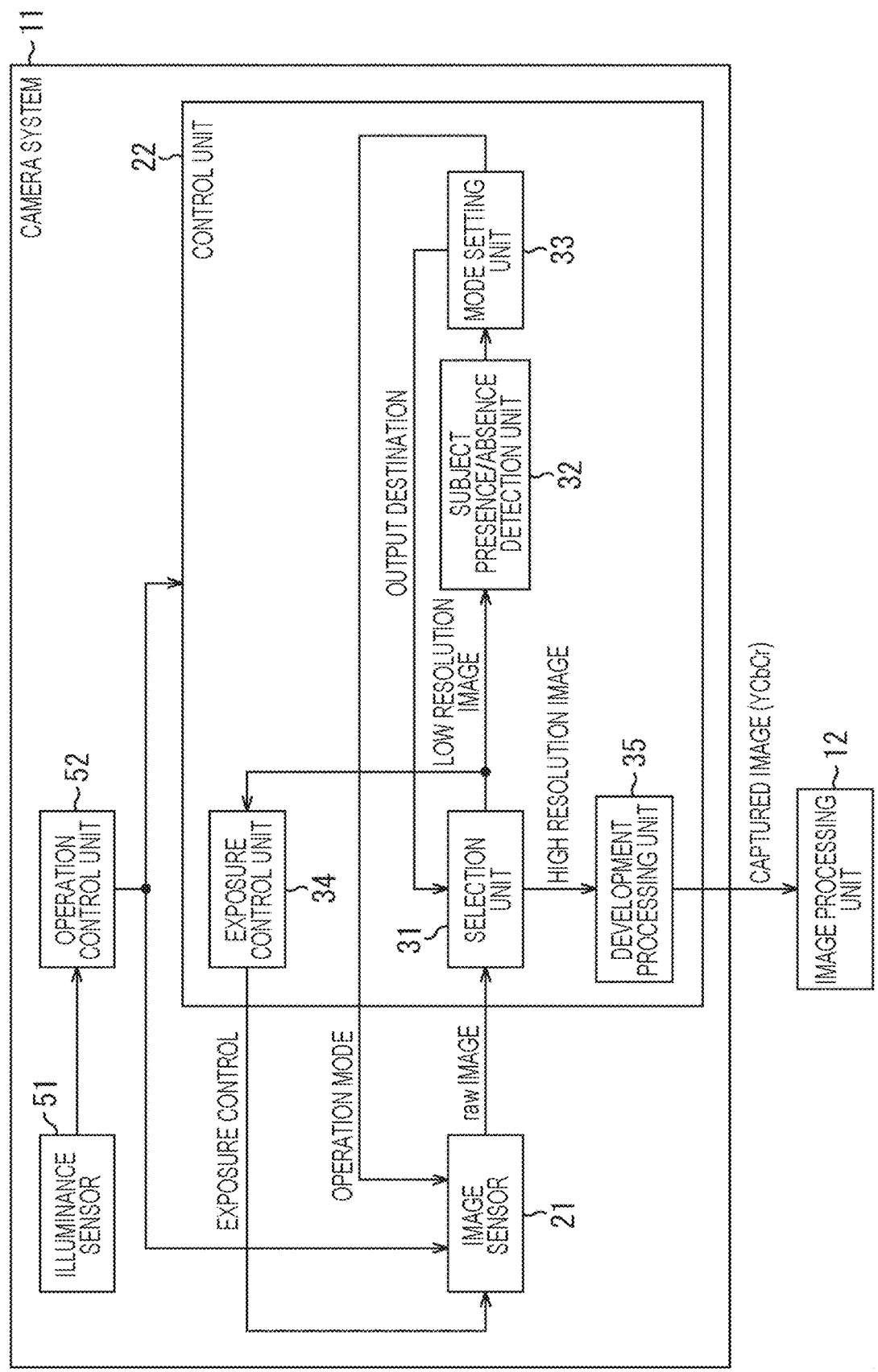
FIG. 9 is a block diagram illustrating a different configuration example of the camera system 11.

FIG. 9 is a block diagram illustrating a different configuration example of the camera system 11 of FIG. 1.

Note that portions in the drawing corresponding to those of FIG. 2 are designated by the same reference numerals, and description is omitted below as appropriate.

In FIG. 9, the camera system 11 includes the image sensor 21, the control unit 22, an illuminance sensor 51, and an operation control unit 52.

Accordingly, the camera system 11 of FIG. 9 is identical to the case of FIG. 2 in that the camera system 11 includes the image sensor 21 and the control unit 22.

However, the camera system 11 of FIG. 9 differs from the case of FIG. 2 in that the camera system 11 newly includes the illuminance sensor 51 and the operation control unit 52.

The illuminance sensor 51 senses surrounding illuminance (range where capturing is performed by the image sensor 21) of the camera system 11 and supplies the illuminance to the operation control unit 52.

The operation control unit 52 controls the operation of the image sensor 21 and the control unit 22 depending on the surrounding illuminance from the illuminance sensor 51.

In other words, in a case where the surrounding illuminance is not equal to or more than the threshold value, i.e., in a case where, for example, the surrounding illuminance is not illuminance to an extent that the low resolution image, which is so bright that the detection processing can be performed by the subject presence/absence detection unit 32, can be captured, the operation control unit 52 controls the image sensor 21 and the control unit 22 and stops the operation of the image sensor 21 and the control unit 22 to stop the operation (to bring into a state in which processing is not performed as much as possible, but processing can be started quickly).

Furthermore, in a case where the surrounding illuminance is equal to or more than the threshold value, i.e., in a case where, for example, the surrounding illuminance is illuminance to an extent that the low resolution image, which is bright to an extent that the detection processing can be performed by the subject presence/absence detection unit 32, can be captured, the operation control unit 52 controls the image sensor 21 and the control unit 22 and starts the operation of the image sensor 21 and the control unit 22 to start the operation.

When the image sensor 21 and the control unit 22 start the operation, similar to the case of FIG. 2, the mode setting unit 33 of the control unit 22 sets the operation mode of the image sensor 21 to the low power consumption mode, and the image sensor 21 starts capturing the low resolution image in the low power consumption mode. Furthermore, in the control unit 22, the subject presence/absence detection unit 32 starts the detection processing on the low resolution image captured by the image sensor 21 in the low power consumption mode.

Figure 10:
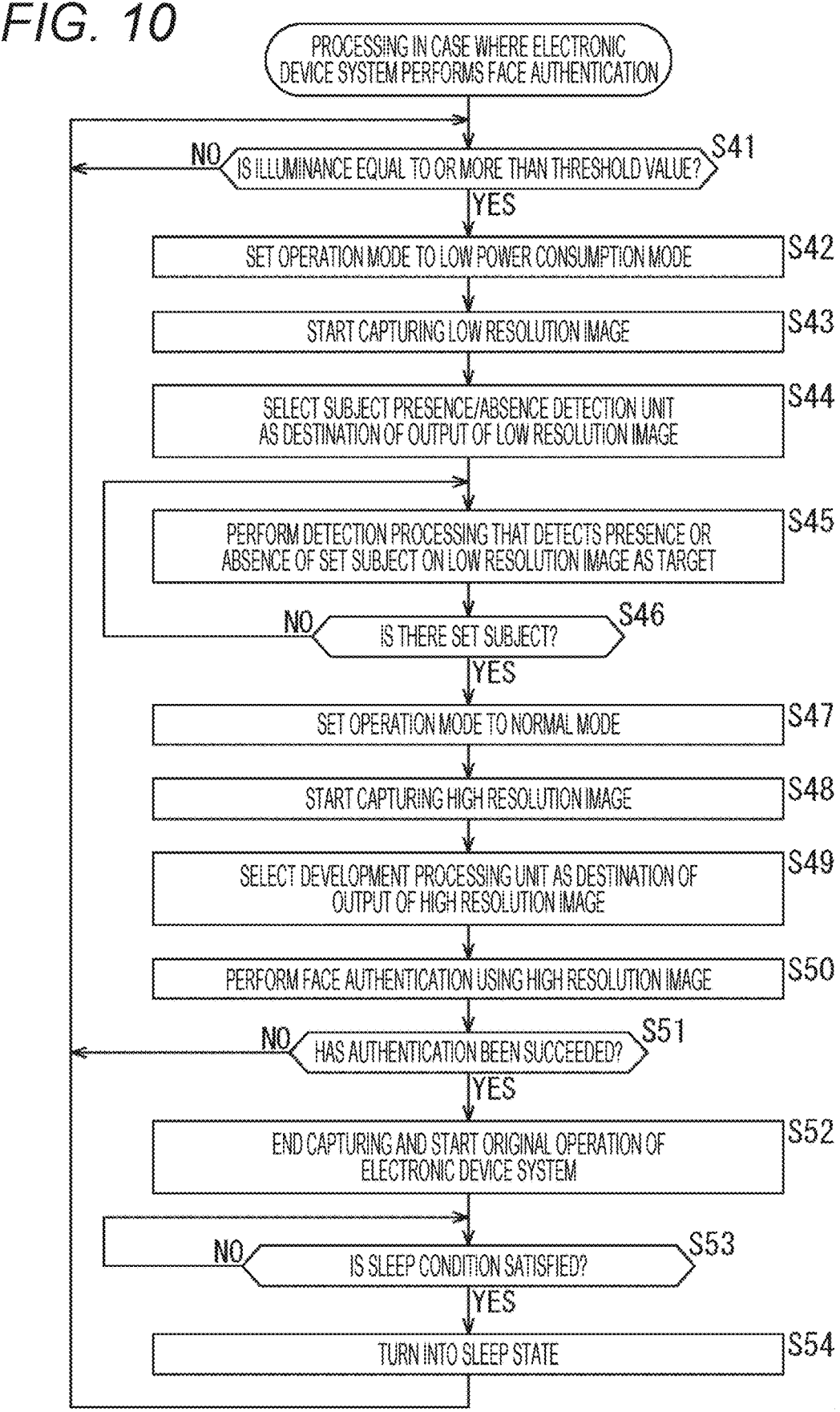
FIG. 10 is a flowchart explaining an example of processing in a case of performing original processing of a smartphone in a case where an electronic device system is the smartphone and face authentication is succeeded.

FIG. 10 is a flowchart explaining an example of processing in a case where a smartphone is unlocked and original processing of the smartphone is performed in a case where the electronic device system including the camera system 11 of FIG. 9 is the smartphone and face authentication has been succeeded.

In step S41, the operation control unit 52 determines whether the surrounding illuminance supplied from the illuminance sensor 51 is equal to or more than the threshold value. In a case where the surrounding illuminance is determined to be not equal to or more than the threshold value, the processing returns to step S41. Similar processing is repeated subsequently.

During the processing of step S41, the operation control unit 52 stops the operation of the image sensor 21 and the control unit 22.

Meanwhile, in step S41, in a case where the operation control unit 52 determines that the surrounding illuminance supplied from the illuminance sensor 51 is equal to or more than the threshold value, the operation control unit 52 starts the operation of the image sensor 21 and the control unit 22. The processing proceeds to step S42.

In steps S42 to S54, the processing similar to those of steps S11 to S23 of FIG. 3 is performed.

Then, in step S54, when the electronic device system, which is a smartphone, turns into the sleep state, the processing returns to step S41. Similar processing is repeated subsequently.

As described above, by the processing following the flowchart of FIG. 10, in a case where the surrounding illuminance is not equal to or more than the threshold value, the operation of the image sensor 21 and the control unit 22 is stopped. When the surrounding illuminance becomes equal to or more than the threshold value, the operation starts, and the processing similar to the case of FIG. 3 is performed.

The power consumption (e.g., a few μW) of the illuminance sensor 51 is sufficiently smaller than the power consumption (e.g., about 1.5 mW) of the image sensor 21 in the low power consumption mode. Accordingly, by the processing following the flowchart of FIG. 10, as compared with the case of FIG. 3, the power consumption of the image sensor 21 can be further reduced.

<Description of a Computer to which the Present Technology has been Applied>

Next, the series of processing of the control unit 22 and the image processing unit 12 described above can be performed by hardware, and it can also be performed by software. In a case where the series of processing is performed by software, a program constituting the software is installed in a microcomputer or the like.

FIG. 11 is a block diagram illustrating a configuration example of an embodiment of a computer in which a program that executes the series of processing is installed.

The program may be preliminarily recorded on a hard disk 105 or a ROM 103, which is a recording medium incorporated in a computer.

Alternatively, the program may be stored (recorded) on a removable recording medium 111. Such a removable recording medium 111 can be provided as so-called package software. Here, examples of the removable recording medium 111 include a flexible disc, a compact disc read only memory (CD-ROM), a magneto optical (MO) disc, a digital versatile disc (DVD), a magnetic disc, a semiconductor memory, or the like.

Note that the program may not only be installed in a computer from the removable recording medium 111 described above, but also be downloaded into a computer and installed in the incorporated hard disk 105 via a communication network or a broadcast network. In other words, for example, the program can be wirelessly transferred to a computer from a download site via an artificial satellite for digital satellite broadcast, or can be transferred to a computer by wire via a network, e.g., a local area network (LAN) or the Internet.

The computer incorporates a central processing unit (CPU) 102. An input/output interface 110 is connected to the CPU 102 via a bus 101.

When a command is input by an operation or the like of the input unit 107 by the user via the input/output interface 110, the CPU 102 executes the program stored in a read only memory (ROM) 103 accordingly. Alternatively, the CPU 102 loads the program stored in the hard disk 105 into a random access memory (RAM) 104 and executes the program.

Thus, the CPU 102 performs the processing following the aforementioned flowchart or the processing performed by the configuration of the aforementioned block diagram. Then, the CPU 102 causes the processing result to be, output from an output unit 106, transmitted from a communication unit 108, recorded by the hard disk 105, or the like, for example, via the input/output interface 110, as needed.

Note that the input unit 107 can include a keyboard, a mouse, a microphone, or the like. Furthermore, the output unit 106 can include a liquid crystal display (LCD), a speaker, or the like.

Here, in the present specification, the processing performed by the computer according to the program is not necessarily needed to be performed in chronological order along the procedure described as the flowchart. In other words, the processing performed by the computer according to the program also includes processing that is executed in parallel or individually (e.g., parallel processing or processing by an object).

Furthermore, the program may be processed by a single computer (processor) or may be processed in a distributed manner by a plurality of computers. Moreover, the program may be transferred to and executed by a remote computer.

Moreover, in the present specification, a system means a cluster of a plurality of constituent elements (apparatuses, modules (parts), etc.) and it does not matter whether or not all the constituent elements are in the same casing. Therefore, a plurality of apparatuses that are housed in different casings and connected by network, and a single apparatus in which a plurality of modules is housed in a single casing are both the system.

Note that the embodiment of the present technology is not limited to the aforementioned embodiments, but various changes may be made within the scope not departing from the gist of the present technology.

For example, the present technology can adopt a configuration of cloud computing in which one function is shared and jointly processed by a plurality of apparatuses via a network.

Furthermore, each step described in the above-described flowcharts can be executed by a single apparatus or shared and executed by a plurality of apparatuses.

Moreover, in a case where a single step includes a plurality of processing, the plurality of processing included in the single step can be executed by a single device or can be divided and executed by a plurality of devices.

Furthermore, the effects described in the present specification are merely illustrative and are not limitative, and other effects may be provided.

Note that the present technology may be configuration as below.

<1>

A control apparatus for an image sensor, including:

a detection unit that detects presence or absence of a preset, predetermined subject from an image having a low resolution output from the image sensor in a low power consumption mode, the image sensor including, as operation modes, the low power consumption mode in which the image having the low resolution is output and a normal mode in which an image having a high resolution as compared with the image having the low resolution is output; and a setting unit that sets the operation mode of the image sensor to the normal mode and causes the image sensor to output the image having the high resolution in a case where presence of the predetermined subject is detected.

<2>

The control apparatus according to <1>, in which authentication is performed using the image having the high resolution.

<3>

The control apparatus according to <1>, in which record of the high resolution image is performed.

<4>

The control apparatus according to any of <1> to <3>, in which the image sensor starts operation in a case where surrounding illuminance is equal to or more than a threshold value.

<5>

A control method for an image sensor, including:

detecting presence or absence of a preset, predetermined subject from an image having a low resolution output from the image sensor in a low power consumption mode, the image sensor including, as operation modes, the low power consumption mode in which the image having the low resolution is output and a normal mode in which an image having a high resolution as compared with the image having the low resolution is output; and setting the operation mode of the image sensor to the normal mode and causes the image sensor to output the image having the high resolution in a case where presence of the predetermined subject is detected.

<6>

A program for causing a computer to function as:

a detection unit that detects presence or absence of a preset, predetermined subject from an image having a low resolution output from an image sensor in a low power consumption mode, the image sensor including, as operation modes, the low power consumption mode in which the image having the low resolution is output and a normal mode in which an image having a high resolution as compared with the image having the low resolution is output; and a setting unit that sets the operation mode of the image sensor to the normal mode and causes the image sensor to output the image having the high resolution in a case where presence of the predetermined subject is detected.

<7>

An electronic device system including:

an image sensor including, as operation modes, a low power consumption mode in which an image having a low resolution is output and a normal mode in which an image having a high resolution as compared with the image having the low resolution is output; and
 a control unit that controls the image sensor,
 the control unit including
 a detection unit that detects presence or absence of a preset, predetermined subject from the image having the low resolution output from the image sensor in the low power consumption mode, and
 a setting unit that sets the operation mode of the image sensor to the normal mode and causes the image sensor to output the image having the high resolution in a case where presence of the predetermined subject is detected.

REFERENCE SIGNS LIST

11 Camera system
12 Image processing unit
13 Battery
21 Image sensor
22 Control unit
31 Selection unit
32 Subject presence/absence detection unit
33 Mode setting unit
34 Exposure control unit
35 Development processing unit
51 Illuminance sensor
52 Operation control unit
101 Bus
102 CPU
103 ROM
104 RAM
105 Hard disk
106 Output unit
107 Input unit
108 Communication unit
109 Drive
110 Input/outout interface
111 Removable recording medium

The invention claimed is:

1. A control apparatus for an image sensor, comprising:
 processing circuitry configured to:
 operate in a sleep state when a surrounding illuminance is less than a threshold value;
 set an operation mode of the image sensor directly from the sleep state to a low power consumption mode in response to detecting that the surrounding illuminance is equal to or greater than the threshold value;
 detect presence or absence of a preset, predetermined subject from an image having a low resolution output from the image sensor when the operation mode is set to the low power consumption mode, the image sensor including, as operation modes, the low power consumption mode in which the image having the low resolution is output and a normal mode in which an image having a high resolution as compared with the image having the low resolution is output; and
 set the operation mode of the image sensor to the normal mode and cause the image sensor to output the image having the high resolution based on detection of the presence of the predetermined subject in the image having the low resolution.

2. The control apparatus according to claim 1,
 wherein authentication is performed using the image having the high resolution.

3. The control apparatus according to claim 1,
 wherein recording of the high resolution image is performed.

4. The control apparatus according to claim 1, wherein the processing circuitry is configured to detect a characteristic shape of the predetermined subject in the image having the low resolution.

5. The control apparatus according to claim 1, wherein the processing circuitry is configured to detect the predetermined subject in a predetermined area of the image having the low resolution.

6. A control method for an image sensor, comprising:
 operating in a sleep state when a surrounding illuminance is less than a threshold value;
 setting an operation mode of the image sensor directly from the sleep state to a low power consumption mode in response to detecting that the surrounding illuminance is equal to or greater than the threshold value;
 detecting presence or absence of a preset, predetermined subject from an image having a low resolution output from the image sensor when the operation mode is set to the low power consumption mode, the image sensor including, as operation modes, the low power consumption mode in which the image having the low resolution is output and a normal mode in which an image having a high resolution as compared with the image having the low resolution is output; and
 setting the operation mode of the image sensor to the normal mode and causing the image sensor to output the image having the high resolution based on detection of the presence of the predetermined subject in the image having the low resolution.

7. A non-transitory computer readable medium storing instructions that, when executed by processing circuitry, perform a control method for an image sensor, comprising:
 operating in a sleep state when a surrounding illuminance is less than a threshold value;
 setting an operation mode of the image sensor directly from the sleep state to a low power consumption mode in response to detecting that the surrounding illuminance is equal to or greater than the threshold value;
 detecting presence or absence of a preset, predetermined subject from an image having a low resolution output from an image sensor when the operation mode is set to the low power consumption mode, the image sensor including, as operation modes, the low power consumption mode in which the image having the low resolution is output and a normal mode in which an image having a high resolution as compared with the image having the low resolution is output; and
 setting the operation mode of the image sensor to the normal mode and causing the image sensor to output the image having the high resolution based on detection of the presence of the predetermined subject in the image having the low resolution.

8. An electronic device system comprising:
 an image sensor including, as operation modes, a low power consumption mode in which an image having a low resolution is output and a normal mode in which an image having a high resolution as compared with the image having the low resolution is output; and
 a control unit that controls the image sensor,
 the control unit including processing circuitry configured to:
 operate in a sleep state when a surrounding illuminance is less than a threshold value;
 set an operation mode of the image sensor directly from the sleep state to a low power consumption mode in response to detecting that the surrounding illuminance is equal to or greater than the threshold value;

detect presence or absence of a preset, predetermined subject from the image having the low resolution output from the image sensor when the operation mode is set to the low power consumption mode, and set the operation mode of the image sensor to the normal mode and cause the image sensor to output the image having the high resolution based on detection of the presence of the predetermined subject in the image having the low resolution.

\* \* \* \* \*